(12) United States Patent
Kagami et al.

(10) Patent No.: US 12,028,655 B2
(45) Date of Patent: Jul. 2, 2024

(54) VEHICLE DISPLAY DEVICE

(71) Applicant: TOYOTA JIDOSHA KABUSHIKI KAISHA, Toyota (JP)

(72) Inventors: Ayaka Kagami, Inazawa (JP); Atsushi Hanawa, Miyoshi (JP); Soshiro Murata, Nagoya (JP); Hideo Hasegawa, Nagoya (JP); Genshi Kuno, Kasugai (JP); Yuta Kikuzaki, Tokyo (JP); Yuu Oomi, Tokyo (JP); Takeshi Yamada, Anjo (JP); Masako Furuta, Kariya (JP); Toshihisa Shimome, Gifu (JP); Kensuke Sasaki, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 17/548,898

(22) Filed: Dec. 13, 2021

(65) Prior Publication Data
US 2022/0201254 A1    Jun. 23, 2022

(30) Foreign Application Priority Data

Dec. 17, 2020 (JP) .................................. 2020-208969

(51) Int. Cl.
*H04N 21/414* (2011.01)
*B60K 35/00* (2006.01)
*H04N 7/18* (2006.01)
*H04N 21/214* (2011.01)
*G02B 27/01* (2006.01)

(52) U.S. Cl.
CPC ............. *H04N 7/183* (2013.01); *B60K 35/00* (2013.01); *H04N 21/41422* (2013.01); *B60K 2370/152* (2019.05); *G02B 2027/0196* (2013.01); *H04N 21/2146* (2013.01)

(58) Field of Classification Search
CPC ......... H04N 21/41422; H04N 21/2146; H04N 7/183; B60K 35/00; B60K 2370/152; G02B 2027/0196
See application file for complete search history.

(56) References Cited

U.S. PATENT DOCUMENTS

| | | | |
|---|---|---|---|
| 2014/0267975 A1* | 9/2014 | Ying | B60Q 3/47 362/520 |
| 2017/0134786 A1* | 5/2017 | Dame | B64D 11/0015 |
| 2019/0101976 A1* | 4/2019 | Reichow | G01S 17/931 |
| 2019/0124301 A1 | 4/2019 | Yoshii et al. | |
| 2019/0235824 A1 | 8/2019 | Ikeda et al. | |
| 2020/0017026 A1* | 1/2020 | Kumar | G06F 3/012 |
| 2020/0182643 A1* | 6/2020 | Ludwig | H04N 21/2668 |

(Continued)

FOREIGN PATENT DOCUMENTS

| | | |
|---|---|---|
| JP | 2019-132951 A | 8/2019 |
| JP | 2020-140487 A | 9/2020 |
| WO | 2017/208719 A1 | 12/2017 |

*Primary Examiner* — Pinkal R Chokshi
(74) *Attorney, Agent, or Firm* — Oliff PLC

(57) ABSTRACT

A vehicle display device includes a theme-specific related information storage unit that stores videos related to destinations and a display that reads a related video from the theme-specific related information storage unit and displaying the related video for a corresponding one of the destinations. The vehicle display device thus allows users in a vehicle to maintain excitement until a vehicle arrives in the destination.

6 Claims, 5 Drawing Sheets

(56) References Cited

U.S. PATENT DOCUMENTS

| | | |
|---|---|---|
| 2020/0278211 A1 | 9/2020 | Murakami et al. |
| 2020/0307437 A1* | 10/2020 | Thieberger ........... B62D 47/006 |
| 2020/0329342 A1* | 10/2020 | Beaurepaire ............ G06F 9/451 |
| 2022/0074756 A1* | 3/2022 | Gewickey .............. G06Q 50/14 |
| 2022/0197579 A1* | 6/2022 | Kagami .................... G06F 3/14 |

* cited by examiner

VEHICLE DISPLAY DEVICE

CROSS-REFERENCE TO RELATED APPLICATION

This application claims priority to Japanese Patent Application No. 2020-208969 filed on Dec. 17, 2020, incorporated herein by reference in its entirety.

BACKGROUND

1. Technical Field

The present disclosure relates to a vehicle display device mounted on a vehicle that moves toward a destination.

2. Description of Related Art

It has been proposed that videos are displayed on an inner wall surface of a vehicle since passengers often get bored with just seeing a landscape outside of the vehicle while the vehicle is moving. WO 2017/208719 describes that various videos are displayed on the inner wall surface of the vehicle. The inner wall surface includes a window, and in an autonomous driving vehicle, a front window is also included in the inner wall surface for displaying the videos. The videos to be displayed may be commercial contents such as movies, videos taken by an in-vehicle camera, videos taken by a drone, archived videos, and the like. The videos are displayed in a non-transparent mode and a transparent mode as needed. In the transparent mode, the passengers can see the landscape.

SUMMARY

Here, in WO 2017/208719, since the videos unrelated to the destination are displayed, users may lose excitement about reaching the destination.

The present disclosure relates to a vehicle display device mounted on a vehicle that moves toward a destination. The vehicle display device includes a related information storage unit for storing videos related to a plurality of determined destinations, and a display unit for reading a related video from the related information storage unit and displaying the related video for a corresponding one of the destinations.

A scenery related to the destination is stored in the related information storage unit.

The destination may be an entertainment facility or a divided area.

The entertainment facility may be divided into a plurality of the divided areas, the divided areas having different themes. The vehicle may select one of the divided areas as the destination. The display unit may display the video related to the divided area in which the vehicle arrives.

According to the present disclosure, since the video related to the destination is displayed, excitement about reaching the destination is maintained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. The present disclosure is not limited to the embodiment described below.

Vehicle Operation Mode

In the embodiment, entertainment facilities that entertain visitors under a specific theme (concept) are focused as a destination to visit. In such entertainment facilities, the culture of a specific country, stories, movies, etc. are often set as one of the themes. Note that the destination is not limited to the above entertainment facilities, and may include a zoo or a park.

Figure 1:
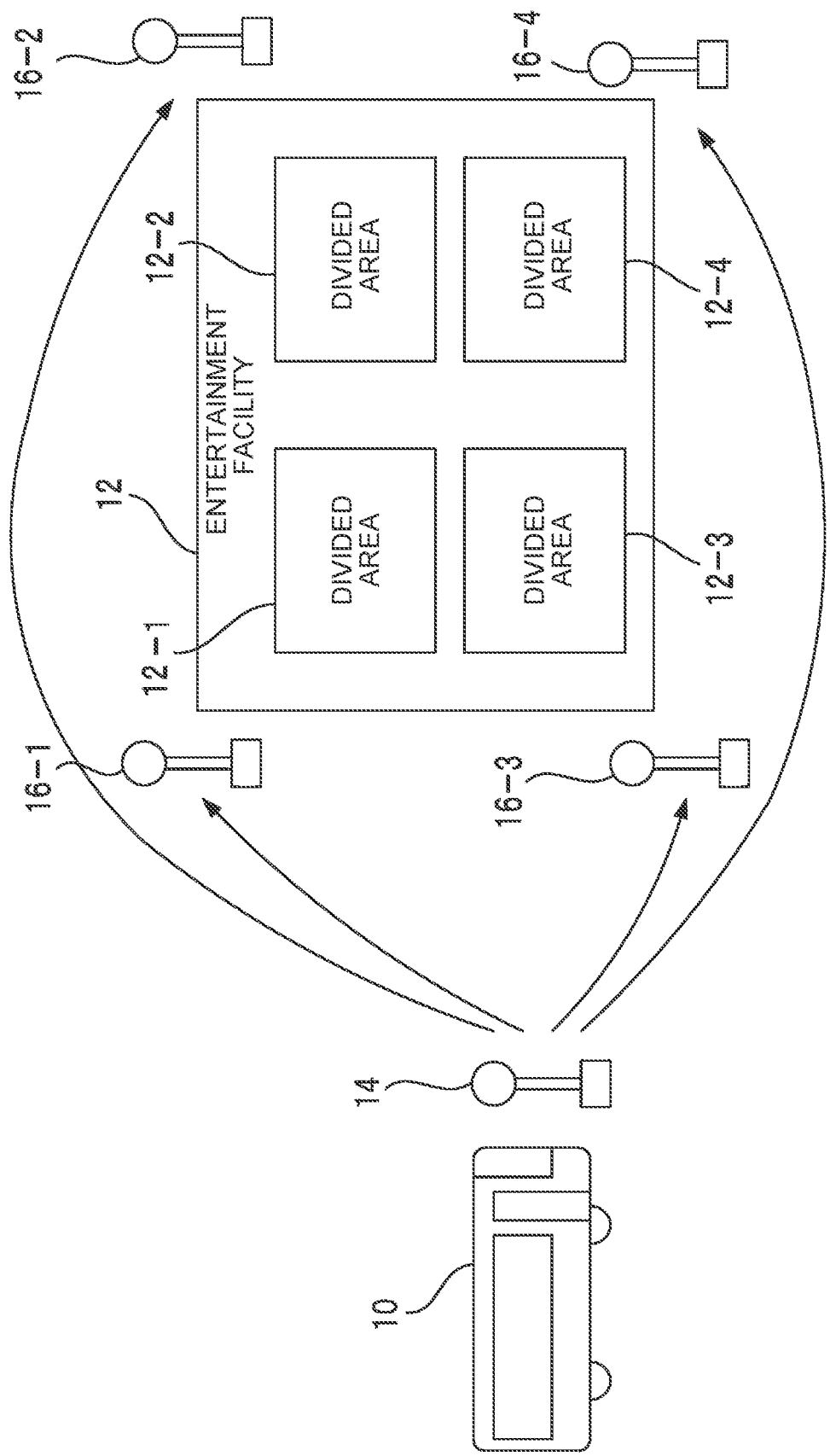
FIG. 1 schematically shows an operation mode of a vehicle equipped with a vehicle display device according to an embodiment.

FIG. 1 schematically shows an operation mode of a vehicle equipped with a vehicle display device according to the embodiment. In this example, a vehicle 10 operates from one terminal stop 14 to a stop 16-$n$ (16-1 to 16-4) in an entertainment facility 12. As the terminal stop 14, the nearest railway station to the entertainment facility 12 or the like is assumed. The vehicle 10 may be a private car or the like.

The entertainment facility 12 is divided into four areas 12-1, 12-2, 12-3, and 12-4 for four themes 1 to 4 with different concepts. The stops 16-1, 16-2, 16-3, and 16-4 are provided corresponding to the divided areas 12-1, 12-2, 12-3, and 12-4, respectively. In this example, the divided areas 12-1, 12-2, 12-3, and 12-4 are destination points. Since the divided areas 12-1, 12-2, 12-3, and 12-4 and the stops 16-1, 16-2, 16-3, and 16-4 are not limited to four, any one of the divided areas and any one of the stops are expressed as a divided area 12-$n$ and a stop 16-$n$ ($n$ is a natural number), respectively.

In this example, the vehicle 10 is a shared bus, and directly goes to any one of the stops 16-$n$ (16-1, 16-2, 16-3, and 16-4) from the terminal stop 14. The vehicle 10 may directly go to one stop 16-$n$, and then sequentially stop at another stop 16-$n$.

Vehicle Configuration

Configuration for Display Control

Figure 2:
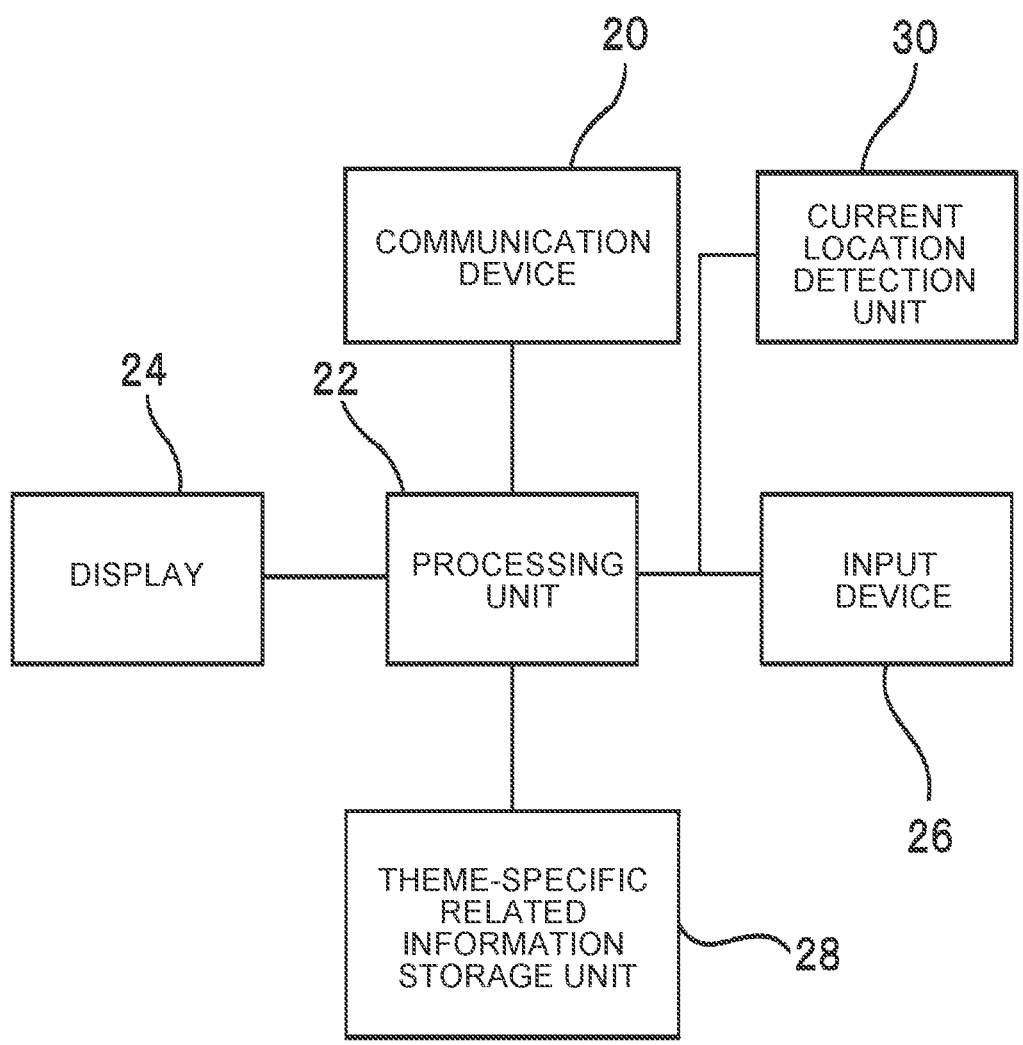
FIG. 2 is a diagram showing a configuration of a display control device mounted on the vehicle.

FIG. 2 is a diagram showing a configuration of a display control device mounted on the vehicle 10. A communication device 20 is connected to a communication line such as the Internet via wireless communication, and performs processing for various communications. In this example, communication with a management computer in the entertainment facility 12 is possible.

A processing unit 22 is connected to the communication device 20, and the processing unit 22 performs various types of data processing. A display 24 as display means and an input device 26 are connected to the processing unit 22. A liquid crystal, an organic electro luminescence (EL), a projection display, etc. can be adopted for the display 24 for displaying videos on an inner wall surface of the vehicle 10. Further, a theme-specific related information storage unit 28 as related information storage means is connected to the processing unit 22, and theme related information including related videos for each divided area is stored. The theme-specific related information storage unit 28 may store the theme related information for a long period of time, or may temporarily store the theme related information distributed via the communication device 20.

Further, a current location detection unit 30 for detecting a current location of the vehicle 10 is connected to the processing unit 22. A global navigation satellite system (GNSS) such as Global Positioning System (GPS) is adopted for the current location detection unit 30.

The theme related information stored in the theme-specific related information storage unit 28 is, for example, a scenery of one divided area 12-*n*, a video of an attraction, or a video showing a state of the facility. As will be described later, since the video of the divided area 12-*n* in which users will arrive is read from the related video of each divided area 12-*n* stored in the theme-specific related information storage unit 28, and then displayed and played, the users can know how to enjoy in the divided area 12-*n* that is a destination, resulting in increasing excitement for the users.

Configuration of Vehicle

The configuration of the vehicle 10 for transporting the users from the terminal stop 14 to the stop 16-*n* will be described. The vehicle 10 may be a manually driven vehicle operated by a driver or an autonomous driving vehicle. Regarding the autonomous driving vehicle, for example, based on the standards set by the Society of Automotive Engineers (SAE International), it is preferable that the vehicle 10 operate at level 4 (highly automated driving) or level 5 (fully automated driving).

Figure 3:
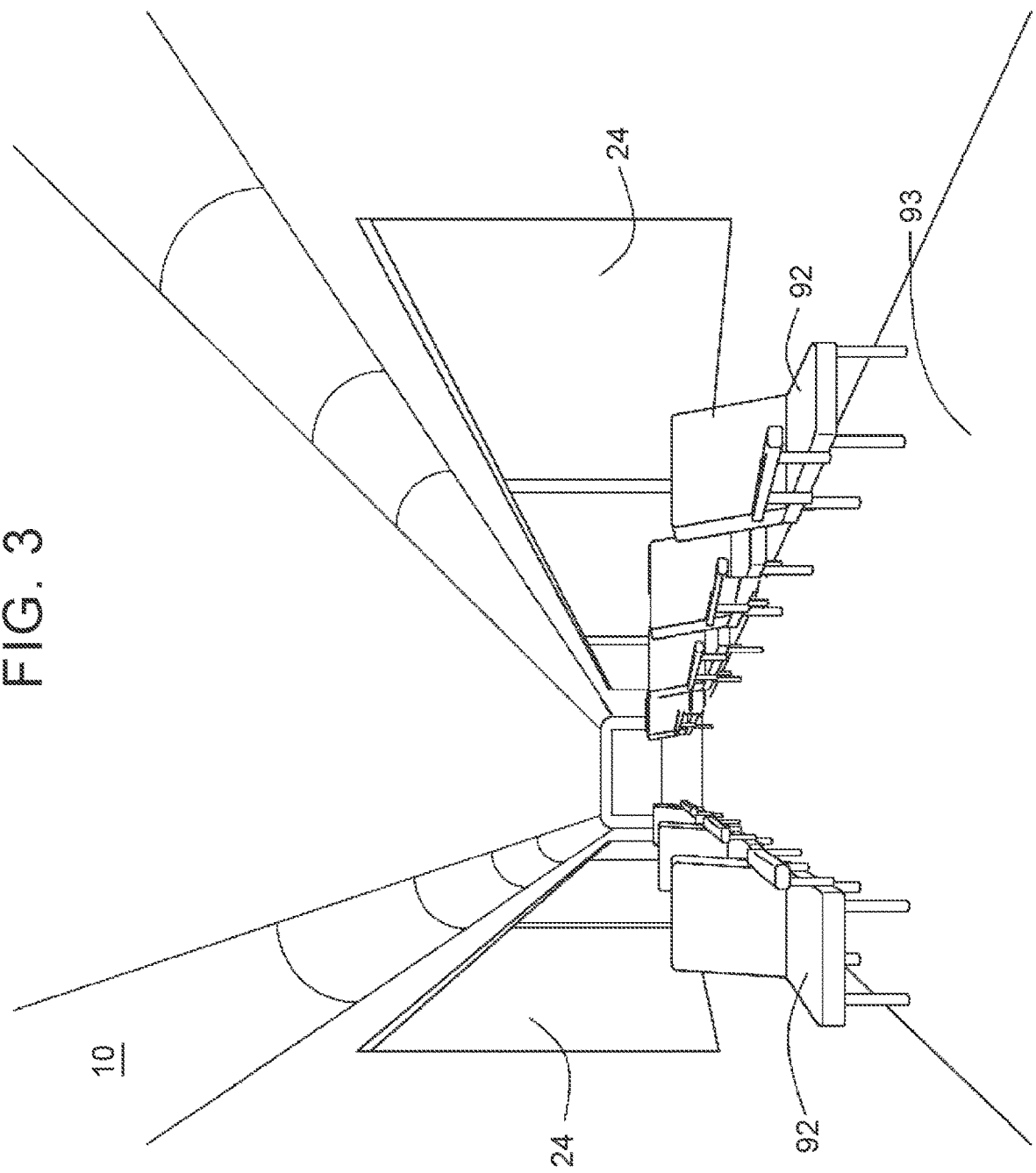
FIG. 3 is a diagram illustrating a state of a vehicle cabin of the vehicle.

FIG. 3 illustrates a state of a vehicle cabin of the vehicle 10. A plurality of seats 92 is arranged in the vehicle cabin in the longitudinal direction of the vehicle 10. Further, an aisle 93 is provided in the center of the vehicle cabin in the vehicle width direction. The aisle 93 extends in the longitudinal direction of the vehicle 10. A row of the seats 92 extends in the longitudinal direction of the vehicle 10 on each side of the aisle 93.

The display 24 is provided as a vehicle window of the vehicle 10. That is, in this vehicle 10, instead of providing glass windows as vehicle windows on the right and left sides of the vehicle, the display 24 is provided. The display 24 is arranged such that a display surface of the display 24 faces the vehicle cabin. The display 24 can have both a transparent mode and a non-transparent mode by using, for example, an organic EL display.

Figure 4:
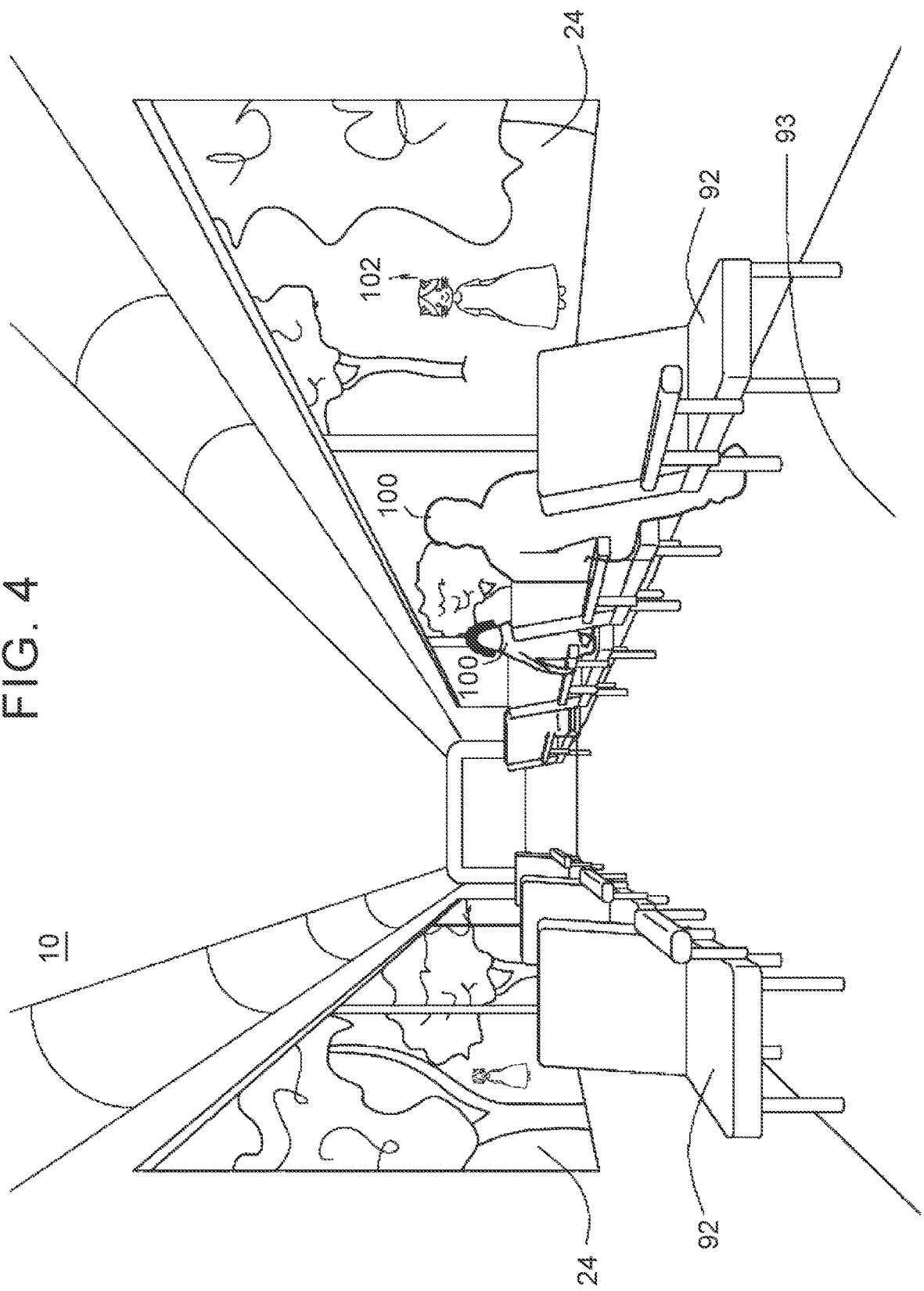
FIG. 4 is a diagram showing an example of displaying a scenery of an entertainment facility in the vehicle cabin of the vehicle.

Then, for example, as shown in FIG. 4, the display 24 displays the scenery of the divided area 12-*n* that is a destination. Since the related video is displayed on the window, it is preferable that the related video be the scenery, but not limited to this. The related video may be videos of characters, videos of attractions, videos of related movies and cartoons, and a state of inside of facilities in the divided area 12-*n*.

In the autonomous driving vehicle, the front window may also serve as the display 24 for displaying the video. Further, in a normal vehicle, a partition may be provided between the driver's seat and the passenger's seat, and the display 24 may be installed in the area. Further, the display 24 may be provided on the ceiling or the like. The passengers cannot see the landscape when the display 24 installed in a place other than the window stops displaying the video. Therefore, during the period for which the video is not displayed on the window, the landscape outside of the vehicle 10 may be captured and displayed, or a video prepared in advance may be displayed on the place. The passengers can also see the landscape in the transparent mode of the display 24.

Further, in this example, the display 24 itself can be switched between the transparent mode and the non-transparent mode, but the display 24 may be physically movable.

Note that, in FIG. 3, the landscape outside of the vehicle 10 is omitted for convenience, and in FIG. 4, the display 24 displays videos in the non-transparent mode, and passengers 100 and a character 102 are also shown.

Video Display Processing

First, related videos are created according to each divided area 12-*n*. The related videos correspond to various introductory videos in the divided area 12-*n*. The related videos may be related to videos of people enjoying the attraction, how to use the facility, cartoons of characters, movie digests and themes, and may include movies that have already been released, related character goods, related events, videos for past events, interviews with creators, storyboards, filmmaking secrets, and the like.

Further, it is preferable that the length of the video be within the moving time of the vehicle 10, a plurality of videos that lasts a comparatively short period of time be prepared, or videos that last various periods of time be prepared. As a result, it is possible to display the videos in an appropriate combination according to the time required for the vehicle 10 to reach the divided area 12-*n*.

In addition, the landscape of the route of the vehicle 10 is studied, and objects to be shown and objects not to be shown are specified.

Figure 5:
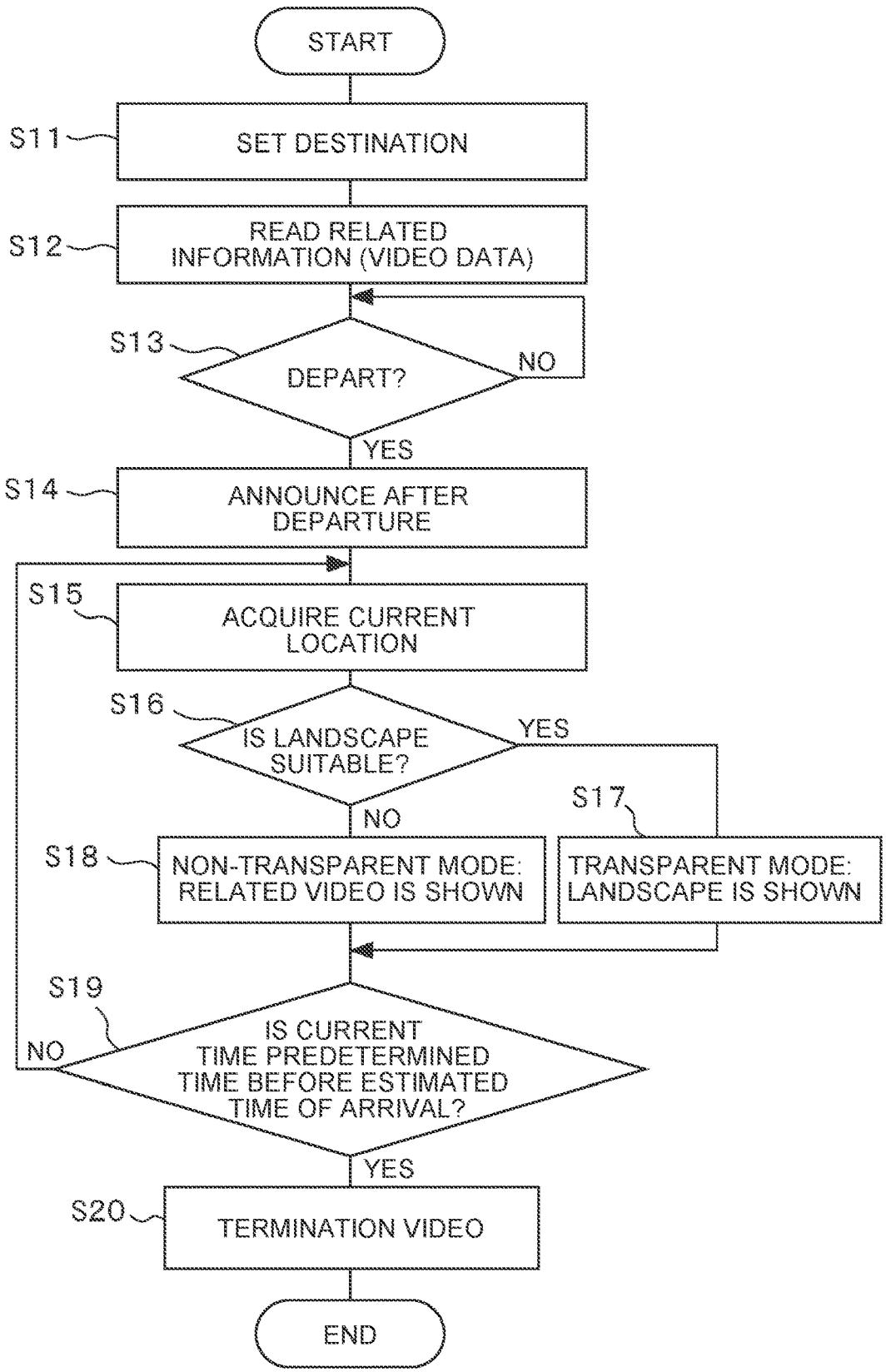
FIG. 5 is a flowchart showing a video display process in the vehicle.

FIG. 5 is a flowchart showing a video display process in the vehicle 10. First, a destination is set (S11). In this example, the vehicle 10 is a shared bus whose destination is the entertainment facility 12, and any one of the stops 16-*n* is set as the destination. When the destination is set, the related information (video data) about the destination is read (S12).

Then, when the vehicle 10 departs for the destination (YES in S13), an announcement is issued after departure (S14), and the current location detection unit 30 acquires the current location (S15).

Then, it is determined whether the landscape of the current location is suitable to be shown (S16). When the landscape is suitable, the display 24 is set to the transparent mode and the landscape is shown (S17). When the landscape is not suitable, the display 24 is set to the non-transparent mode and the video obtained by playing the video data prepared in advance is shown (S18). Note that the landscape to be shown and not to be shown includes objects such as specific buildings, monuments, and signboards.

Then, it is determined whether the current time is a predetermined time before the estimated time of arrival at the destination (S19). When the current time is not the predetermined time before the estimated time, the process returns to S15 and the control of the display 24 is repeated. When the current time is the predetermined time before the estimated time, a termination process for playing termination videos is performed (S20).

As described above, in the embodiment, the landscape of the traveling route of the vehicle 10 is checked, and the relationship with the target divided area 12-*n* is studied. In this study, objects to be shown and objects not to be shown are determined. For example, information boards, buildings, and characters related to the target divided area 12-*n* correspond to the objects to be shown, and objects related to another divided area 12-*n* correspond to the objects not to be shown. When the vehicle 10 is traveling, the related videos are played while the landscape not to be shown is not shown and the landscape to be shown is shown. As a result, it is possible to maintain a feeling of expectation for enjoying in the divided area 12-*n* that is the destination, and increase excitement for the users.

What is claimed is:

1. A vehicle display device mounted on a vehicle that moves toward a destination out of a plurality of determined destinations, the vehicle display device comprising:
   a related information storage unit for storing videos related to the plurality of determined destinations; and
   a display unit for reading a related video from the related information storage unit and displaying the related video for the destination, wherein
   the display unit is configured to:
      determine whether a landscape of a current location of the vehicle is suitable to be shown on a display, wherein the landscape of the current location of the vehicle is suitable when the landscape is related to the destination out of the plurality of determined destinations and the landscape of the current location of the vehicle is not suitable when the landscape is related to another destination out of the plurality of determined destinations;
      set, when the landscape is suitable, the display to a transparent mode to show the landscape;
      set, when the landscape is not suitable, the display to a non-transparent mode to show the related video for the destination;
      determine whether a current time is a predetermined time before an estimated time of arrival at the destination;
      perform, regardless of whether the landscape is suitable, a termination process for playing termination videos in response to determining that the current time is the predetermined time before the estimated time of the arrival at the destination.

2. The vehicle display device according to claim 1, wherein a scenery related to the destination is stored in the related information storage unit.

3. The vehicle display device according to claim 1, wherein the destination is an entertainment facility or a divided area.

4. The vehicle display device according to claim 3, wherein:
   the entertainment facility is divided into a plurality of the divided areas, the divided areas having different themes;
   the vehicle selects one of the divided areas as the destination; and
   the display unit displays the video related to the divided area in which the vehicle arrives.

5. The vehicle display device according to claim 1, wherein the landscape includes at least one of a building, a monument, or a signboard.

6. The vehicle display device according to claim 1, wherein
   the videos are prepared in advance, and
   when the landscape is not suitable, the display plays the related video for the destination.

* * * * *